United States Patent [19]

Paros et al.

[11] Patent Number: 4,651,569

[45] Date of Patent: Mar. 24, 1987

[54] TORQUE TUBE DIGITAL DIFFERENTIAL PRESSURE SENSOR

[75] Inventors: Jerome M. Paros; Walter P. Kistler; Donald W. Busse, all of King County, Wash.

[73] Assignee: Paroscientific, Inc., Redmond, Wash.

[21] Appl. No.: 729,476

[22] Filed: May 1, 1985

[51] Int. Cl.[4] .......................... G01L 7/04; G01L 7/06; G01L 7/08; G01L 9/00
[52] U.S. Cl. ..................................... 73/704; 73/717; 73/736; 310/321
[58] Field of Search ............. 73/702, 704, 701, 432 A, 73/309, 862.08; 310/321, 716, 717, 718, 719, 720, 721, 722, 736

[56] References Cited

U.S. PATENT DOCUMENTS 1,827,560 10/1931 Binckley ........................ 73/862.08
4,406,966 9/1983 Paros ................................... 73/702
4,476,725 10/1984 Chorel et al. ...................... 73/704

Primary Examiner—Donald O. Woodiel
Attorney, Agent, or Firm—Seed and Berry

[57] ABSTRACT

A digital differential pressure sensor with relatively low sensitivity to common mode line pressure errors. The sensor includes an airtight enclosure having a pair of pressure ports through which pressures are coupled to opposite sides of a pressure-sensing diaphragm, bellows, or Bourdon tube. The pressure-sensing elements generate torques which are transmitted by a shaft to stress-sensitive resonators which are isolated from the torque-producing elements by a sealed, flexible tube.

24 Claims, 6 Drawing Figures

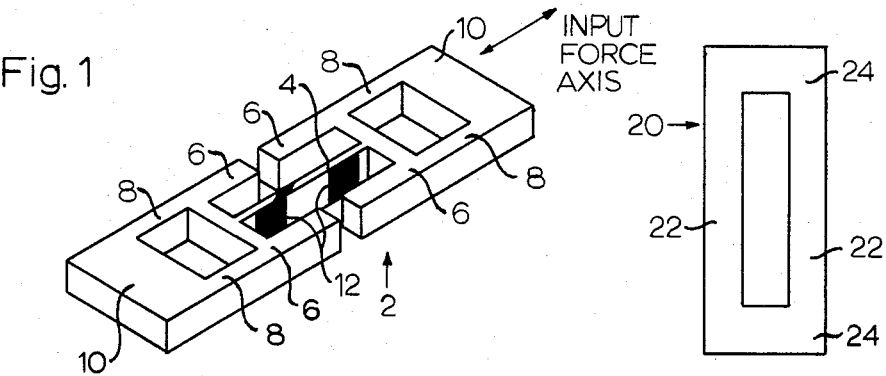
Fig. 1
Fig. 2
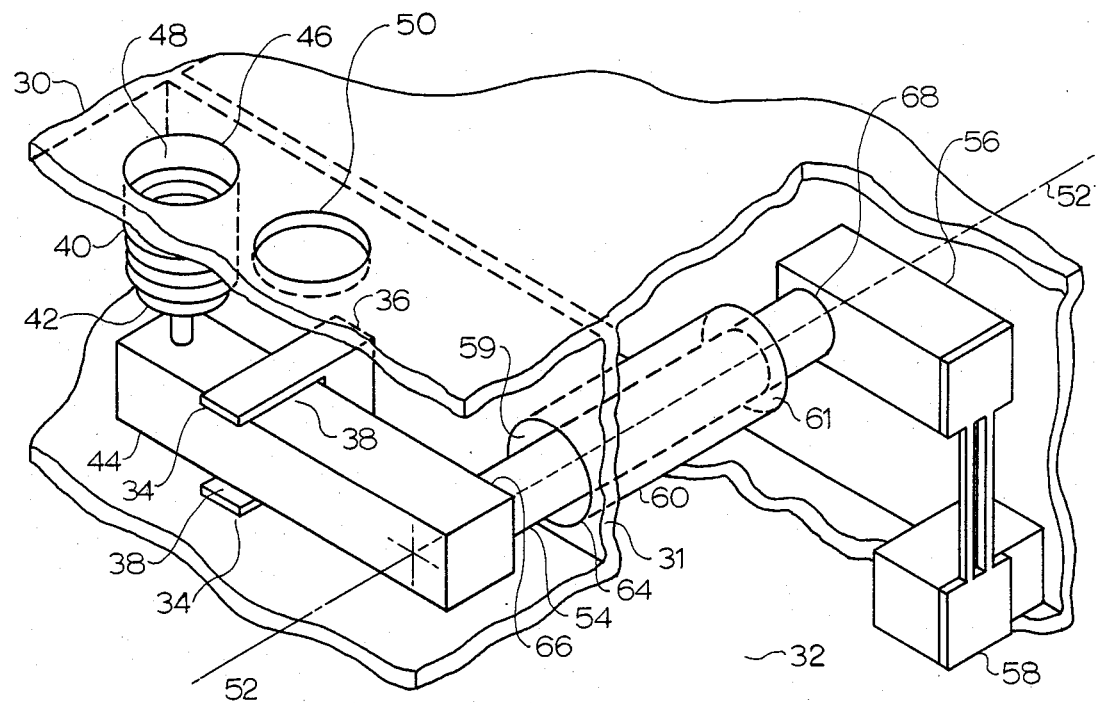
Fig. 3

TORQUE TUBE DIGITAL DIFFERENTIAL PRESSURE SENSOR

DESCRIPTION

1. Technical Field

This invention relates to differential pressure transducers, and more particularly, to differential pressure transducers having a digital output and a low sensitivity to common mode line pressure errors.

2. Background Art

A servo torque-balance pressure transducer with low sensitivity to common mode line pressure is described in U.S. Pat. No. 3,664,237, issued to Paros. This analog output sensor achieves low sensitivity to common mode line pressure through delicate adjustment of lever arm distances between the two bellows pressure inputs and a flexible pivot. The lever arm adjustment is designed to equalize the moments produced about the pivot axis when the same line pressure is applied to both bellows. Differential pressure between the bellows produces a resultant toque which may be measured using conventional servo techniques. The adjustment mechanism is complex and difficult to manufacture, and requires inordinate skill to reduce the common mode line pressure errors to acceptable levels. One difficulty in this design is that since the full-scale differential pressure range is determined by the effective areas of the bellows and the lever arm distances to the pivot, adjustments to the lever arm distances are directly proportional to full scale and, therefore, must be made with great precision. Common mode line pressure errors can nevertheless be reduced to an acceptable level with this device, since it produces an analog output which is inherently limited in accuracy. However, an analog output is less desirable than the more accurate direct digital-type signal because a digital signal is more compatible with digital computers and control systems. The greater accuracy of the digital sensor makes common mode line pressure errors more apparent than they would be with a device producing a less accurate analog output. Thus conventional differential pressure mechanisms are inherently incapable of providing optimum performance when used with a digital sensor since their common mode pressure errors are an unacceptably high percentage of their differential pressure sensitivity.

In a paper delivered at the 27th Annual ISA Conference and Exhibit in October, 1972, and published in *ISA Transactions*, Vol. 12, 1973, pp. 173–1979, Paros describes the design of a "Precision Digital Pressure Transducer." This sensor employs two coaxial opposing bellows, with sealed ends attached to a pivotal suspension system. The bellows are mounted with the open ends adapted to receive pressure inputs such that a different pressure between the two bellows causes a resultant torque which stresses a vibrating quartz crystal whose frequency change is a measurement of the differential pressure. No provision for reducing the common mode line pressure error is described. This error is caused by differences between the bellows effective area or lever arm distance to the pivot and is directly proportional to full scale.

U.S. Pat. No. 4,382,385, issued to Paros, describes a digital differential pressure transducer with reduced common mode line pressure effects. Differential pressue is applied across a single pressure-sensing diaphragm or bellows, and the force induced by the differential pressure is coupled to a stress-sensitive resonator either directly or through a force-transmitting structure. The resonator, or at least a portion of the force-transmitting structure, is surrounded by a first bellows to isolate the resonator from the pressure-sensing diaphragm or bellows. A second bellows is provided to counteract the pressure-induced force applied to the resonator by the first bellows. The pressure-induced forces generated by the first and second bellows are substantially smaller than the pressure-induced forces generated by the pressure-sensing diaphragm or bellows. The common mode line pressure error of the transducer resulting from a mismatch between the pressure-induced forces generated by the first and second bellows and expressed as a percentage of the full-scale differential pressure range is relatively low because the error is proportional to the ratio of the force mismatch to the force generated by the pressure-sensing diaphragm or bellows.

A number of load-sensitive resonators are known. In an unstressed state, under constant environmental conditions, a vibrating element has a unique resonant frequency determined by its dimensions and material composition. This resonant frequency increases under tensile loading and decreases under compressive loading. The resonant frequency should be a true and accurate measure of the applied load. For optimum performance, stress-sensitive resonators should have a well-defined resonant frequency. Energy losses from the resonator reduce the "Q" or quality factor of the resonator, thereby making the resonant frequency less well defined. One cause of energy loss from a resonator is friction between the resonator and the surrounding environment. The surrounding environment can also, with time, alter the performance of the resonator, thus further degrading its performance. Consequently, it is desirable for resonators to operate in a vacuum or inert atmosphere. U.S. Pat. No. 4,406,966, issued to Paros, describes techniques employing bellows which isolate load-sensitive resonators from the force-producing external environment.

Force-sensitive crystal resonators are described in U.S. Pat. No. 3,984,111, issued to Kritz, and U.S. Pat. No. 3,093,760, issued to Tarasevich, in which loads are applied to crystals near the nodal points.

U.S. Pat. No. 3,470,400, issued to Weisbord, describes a single-beam force transducer with an integral mounting system which effectively decouples the beam vibrations from the mounting points through a spring and mass arrangement.

U.S. Pat. No. 3,238,789, issued to Erdley, describes a load-sensitive, closed-end tuning fork consisting of two tines or bars vibrating 180 degress out of phase, such that the reactive forces and moments cancel.

3. Disclosure of Invention

It is an object of this invention to provide a pressure transducer with an inherently digital-type output.

It is another object of this invention to provide a pressure sensor with high sensitivity, accuracy, and stability.

It is still another object of this invention to provide a pressure transduer of small size and weight, with low power consumption.

It is yet another object of this invention to provide a differential pressure transducer with low sensitivity to common mode line pressure errors.

Differential pressure is applied across a single pressure-sensing pressure vessel, such as a diaphragm, bellows, or Bourdon tube. The resulting load is coupled to a stress-sensitive resonator by means of a torque shaft and force-transmitting structure. The resonator is isolated from the presssure input applied to the outer surface of the pressue vessel by a sealed, flexible, cylindrical torque tube which coaxially surrounds the torque shaft and is connected at spaced-apart locations to the torque shaft and an isolation barrier separating the resonator from the pressure vessel. The axial rigidity of the torque tube restricts axial movement of the torque shaft, while the relatively high torsional compliancy of the torque tube allows relatively free rotation of the torque shaft. Thus, the resonator may operate in a vacuum or inert atmosphere, common mode pressures applied to the isolating torque tube do not generate any torques, and line pressure errors are therefore minimized.

In one embodiment, the force-generating pressure vessel is a bellows which is connected to a pivotally mounted structure and the resulting torque is transmitted by the torque shaft to a pivotally mounted structure which applies a load to the resonator. Flexible linkages may be connected between the torque shaft and the pivotally mounted structure such that the pivots are substantially relieved of cross axis stress due to common mode line pressure effects on the isolating, sealed, flexible torque tube which surrounds the torque shaft.

In another embodiment, the force-generating pressure vessel is a Bourdon tube and the directly resulting torque is transmitted through the torque shaft to load a stress-sensitive resonator. The resonator is isolated from the pressure input side by the flexible, sealed torque tube.

BRIEF DESCRIPTION OF THE DRAWINGS

FIG. 1 is an isometric view illustrating a conventional single-beam force transducer with integral mounting isolation;

FIG. 2 is a plan view illustrating a conventional closed-end tuning fork sensor.

FIG. 3 is an isometric view of a torque tube digital differential pressure sensor employing a pressure-sensitive bellows that generates a torque which is applied to a stress-sensitive resonator through a torque tube, the external surface of the bellows being isolated from the rsonator torque tube.

BEST MODE FOR CARRYING OUT THE INVENTION

Figure 4A:
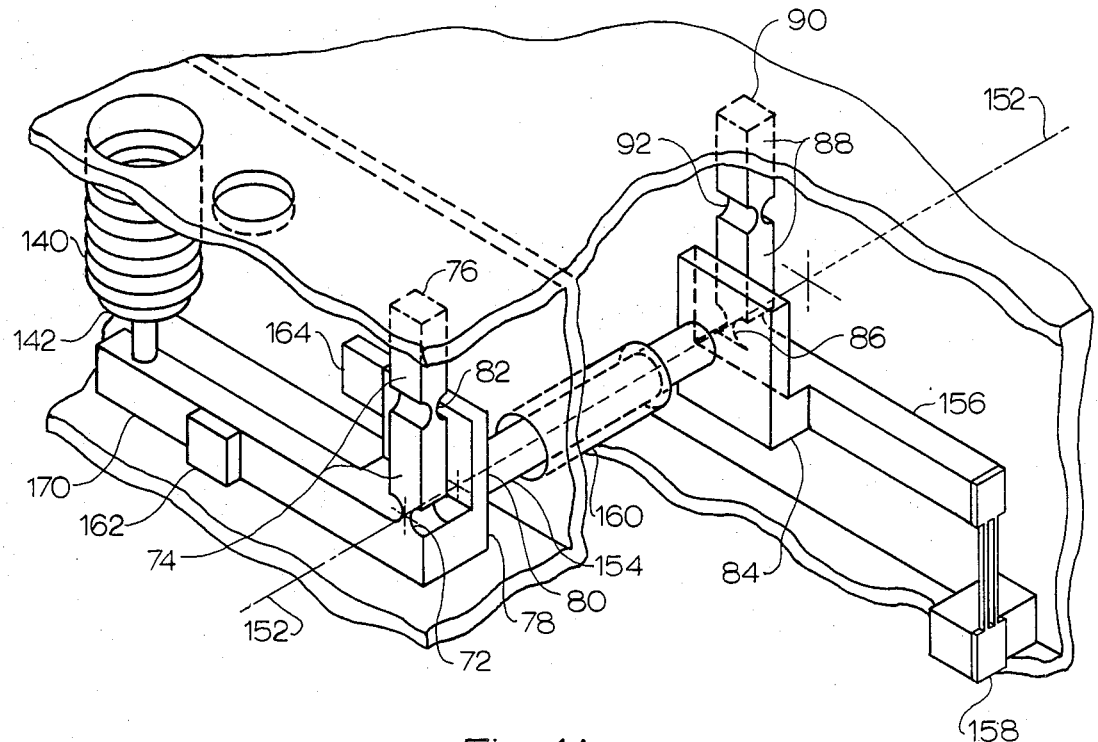
FIG. 4A is an isometric view of a torque tube digital differential pressure sensor of the type illustrated in FIG. 3 employing a pair of flexure hinges supporting the torque shaft to restrict movement of the torque shaft perpendicular to the axis of the torque shaft.

The present invention is equally applicable to load-sensitive resonators of various shapes and configurations; however, simplicity and clarity, only the application to flexurally vibrating, force-sensitive beam and closed-end tuning fork devices will be described in detail, it being understood that the same or similar principles apply in the general case.

FIG. 1 illustrates a conventional single-beam force transducer 2 with integral mounting isolation, as disclosed in the aforementioned patent to Weisbord. The transducer 2 consists of a flexurally vibrating center beam 4, two sets of isolator masses 6 and isolator springs 8 extending from each end of the beam 4 to mounting surfaces 10. Axial forces, applied along the longitudinal axis of the transducer 2 stress the vibrating beam 4, thereby changing its resonant frequency in accordance with the magnitude of the applied loads. The isolator masses 6 and isolator springs 8 are designed to decouple the reactive forces and moments generated by the vibrating beam 4 from the mounts 10, thus reducing the energy losses. As a result, the transducer 2 has a high "Q" so that its resonant frequency is an acurate representation of the applied forces. The "Q" can also be maximized by operating the transducer 2 in a vacuum. The beam 4 may be driven at its resonant frequency using electrodes 12 and oscillator circuitry in any conventional manner, such as is described in U.S. Pat. No. 3,479,536, issued to Norris.

FIG. 2 is a plan view of a conventional closed-end tuning fork 20, as described in the aforementioned patent to Erdley. This device 20 achieves low energy loss, high "Q" operation by driving a pair of closely matched tines 22 180 degrees out of phase, thus cancelling the reactive moments and forces which might be transmitted to a mount 24 from which the tines 22 project. As with the transducer 2 of FIG. 1, the "Q" of the tuning fork 20 can be maximized by operating it in a vacuum.

Under constant environmental conditions, the resonant frequency in Hertz, fo, of an unstressed, fixed-ended, flexurally vibrating beam of length L, thickness t, width b, modulus of elasticity E and density d is given by the formula:

$$f_o = (\text{constant}) \, (t/L^2) \sqrt{(E/d)} \qquad \text{Equation (1)}$$

Although the resonant frequency is generally a non-linear function of the applied load F, the first order load sensitivity $S_F$ may be calculated as:

$$S_F = (\text{constant}) \, (L^2 F / E b t^3) \qquad \text{Equation (2)}$$

The quantitative relationships between resonant frequency, applied load, and resonator dimensions and composition can be determined from the above formulae. In particular, pressure-induced loads may be generated by having the applied pressure P act on a bellows or diaphragm of effective area A, and equation 2 may be restated in terms of the first order pressure sensitivity $S_p$, as:

$$S_p = (\text{constant}) \, (L^2 A P / E b t^3) \qquad \text{Equation (3)}$$

Although a number of load-sensitive resonators may be mechanically stressed to form pressure sensors, the following discussions will illustrate the inventive devices using flexing bar resonators such as the single-beam force transducers with integral mounting isolation and the closed-end tuning fork force sensor.

Most resonators will perform more accurately, with less engery loss and with increased stability, when operating in a vacuum or inert atmosphere. Therefore, a differential pressure transducer construction in which the line pressure is in contact with the resonator is undesirable. Yet, isolating structures such as bellows can themselves apply pressure-induced forces to the resonator, and it is not easy to completely compensate for these isolating structures. For example, the pressure transducer described in U.S. Pat. No. 3,642,237 may be designed to isolate the sensing element from the line pressure through a pair of opposing bellows which act as both isolating elements and differential pressure inputs. In order to make these devices insensitive to common mode line pressure errors, the constructions must include a mechanism which must be adjusted to account for differences in bellows effective areas and pivot lever arm distances. Since the full-scale differential pressure range is determined by the bellows effective areas and lever arm distances, the aforementioned adjustments for line pressure errors must be carefully and skillfully made. It is generally impractical to massproduce differential pressure sensors with sufficient precision to maintain the common mode line pressure error at a level which does not degrade the accuracy of highly precise digital stress sensors. Thus, differential pressure-sensing structures which are acceptable for use with an analog stress sensor can easily be unacceptable for use with a digital stress sensor. Indeed, even though, as described in U.S. Pat. No. 4,382,385, common mode line pressure errors are reduced by the ratio of mismatch between the effective area of the isolating/compensating bellows to the effective area of the pressure-sensitive element, significant common mode errors remain.

FIG. 3 illustrates an embodiment of a digital differential pressure transducer which isolates its stress-sensitive resonator from the pressure inputs and also has a low sensitivity to common mode line pressure errors. This configuration does not require any adjustment mechanism to reduce line pressure erros to acceptable levels.

An airtight enclosure 30 is divided into first and second sections by an isolation barrier 31. A bellows 40 sealed by end cap 42 is mounted in the first section of the enclosure 30 and is attached to a torque-transmitting arm 44 and is sealed to the airtight enclosure 30 at end 46. Pressure ports 48 and 50 in the enclosures are provided such that the interior portion and the exterior portion of the bellows 40 may be independently pressurized. The torque generated about pivot axis 52 is transmitted through torque shaft 54 and arm 56 to stress-sensitive resonator 58 mounted in the second section of the enclosure 30. The torque shaft 54 extends through an aperture 59 in the barrier 31. Torsionally flexible tube 60 is attached and sealed to torque shaft 54 at end 62. Tube 60 is sealed to the barrier 31 over the aperture 59 at end 64. Thus resonator 58 is isolated from the pressure input side containing ports 48 and 50 by the torsionally flexible, sealed torque tube 60, allowing resonator 58 to operate in a vacuum or inert atmosphere 32.

The torque tube 60, which is preferably of cylindrical configuration, has a length that is sufficiently long to make the torque tube 60 relatively compliant to torsional stress. As a result, the torque shaft 54 is relatively free to rotate without significant restraint from the torque tube 60. However, the axial rigidity of the torque tube 60 restrains the torque tube 60 from axial movement. A cover plate 61, connecting the torque tube 60 to the torque shaft 54, is preferably relatively rigid to restrain axial movement of the torque shaft 54 without significantly restraining the torsional stress transmitted to arm 54 and stress-sensitive resonator 58.

Torque-transmitting arm 44 can move up or down only between gaps 38 until it contacts limit stops 34 attached to airtight enclosure 30 at position 36, thus protecting resonator 58 from excessive stress due to overpressure. In order to eliminate unwanted forces and torques, pivot axis 52 may be mechanically defined and constrained by adding single axis pivots at positions 66 and 68.

Although the embodiment illustrated in FIG. 3 utilizes a bellows 48 as the pressure-sensing element, it will be understood that other pressure-sensitive pressure vessels, such as diaphragms, Bourdon tubes and the like, may also be used.

FIG. 4A illustrates an embodiment of a torque tube digital differential pressure sensor including flexural supports which relieve axial stresses in structural parts. A bellows 140 sealed by end cap 142 is attached to a torque-transmitting arm 170 that is constrained to rotate about the pivot axis 152 by flexural pivot 72 that is supported by arm 74 attached at position 76. The torque from torque-transmitting arm 170 is transmitted by bracket 78 to torque shaft 154 at attachment 80, allowing torque shaft 154 to align coaxially with pivot axis 152 and flexural pivot 72. Flexure 82 in arm 74 allows displacement of torque shaft 154 along pivot axis 152 to relieve cross axis stress in flexure pivot 72 caused by thermal expansion of torque shaft 154 or axial stress in tube 160 induced by pressure. Torque shaft 154 transmits torque through bracket 84 that is connected to arm 156. Arm 156 is constrained to rotate about pivot axis 152 by flexural pivot 86 that is supported by arm 88 attached at position 90. Torque generated about pivot axis 152 is transmitted by arm 156 to stress-sensitive resonator 158. Flexure 92 in arm 88 allows displacment of torque shaft 154 along pivot axis 152 to relieve cross axis stress in flexure pivot 86. Counterbalance weights 162 and 164 are attached to torque-transmitting arm 170 and bracket 78, respectively, so that no torque is generated about pivot axis 152 by gravity or acceleration, since the center of gravity can be balanced to coincide with the pivot axis 152.

Figure 4B:
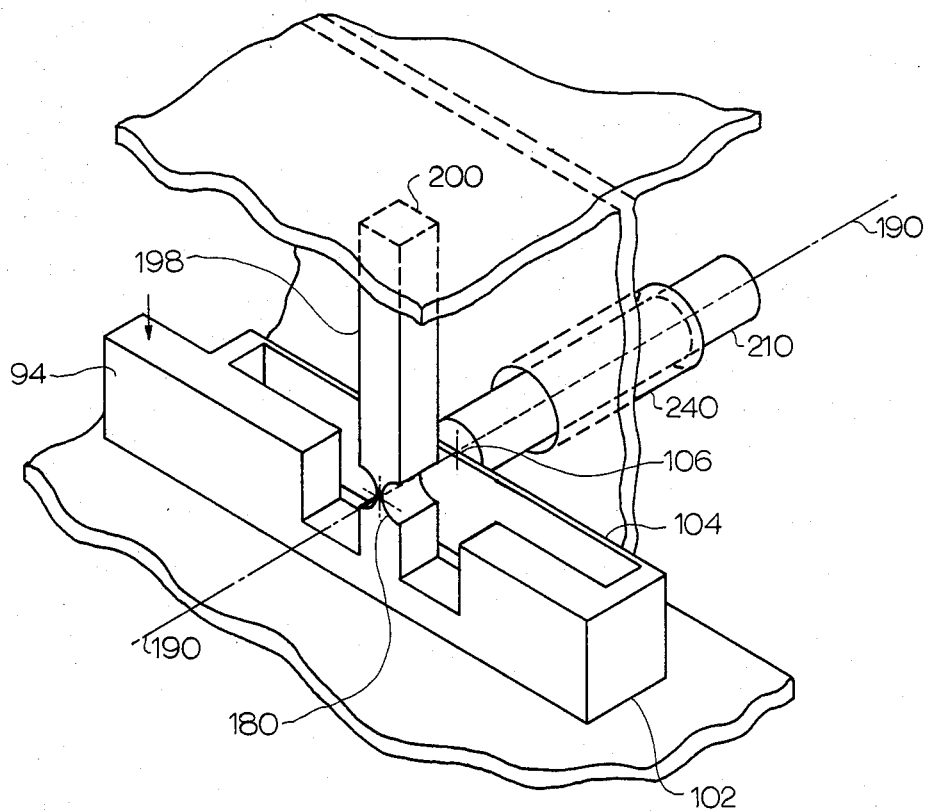
FIG. 4B is an isometric view of a torque tube differential pressure sensor of the type illustrated in FIG. 3 employing flexible linkages transmitting torque from the pressure-sensitive element to the torque shaft to allow axial movement of the torque shaft.

FIG. 4B illustrates an embodiment of a portion of a torque tube digital differential pressure sensor including flexible linkages which relieve axial stresses in flexural pivots. Torque-transmitting arm 94 is constrained to rotate about pivot axis 190 by flexural pivot 180 supported by support 198 constrained at position 200. The torque from torque-transmitting arm 94 is transmitted to torque shaft 210 through axially flexible linkages 104 at attachment point 106. Axially flexible linkages 104 relieve cross axis stress in flexural pivot 180 caused by thermal expansion of torque shaft 210 or axial stress in tube 240 induced by pressure.

Figure 5:
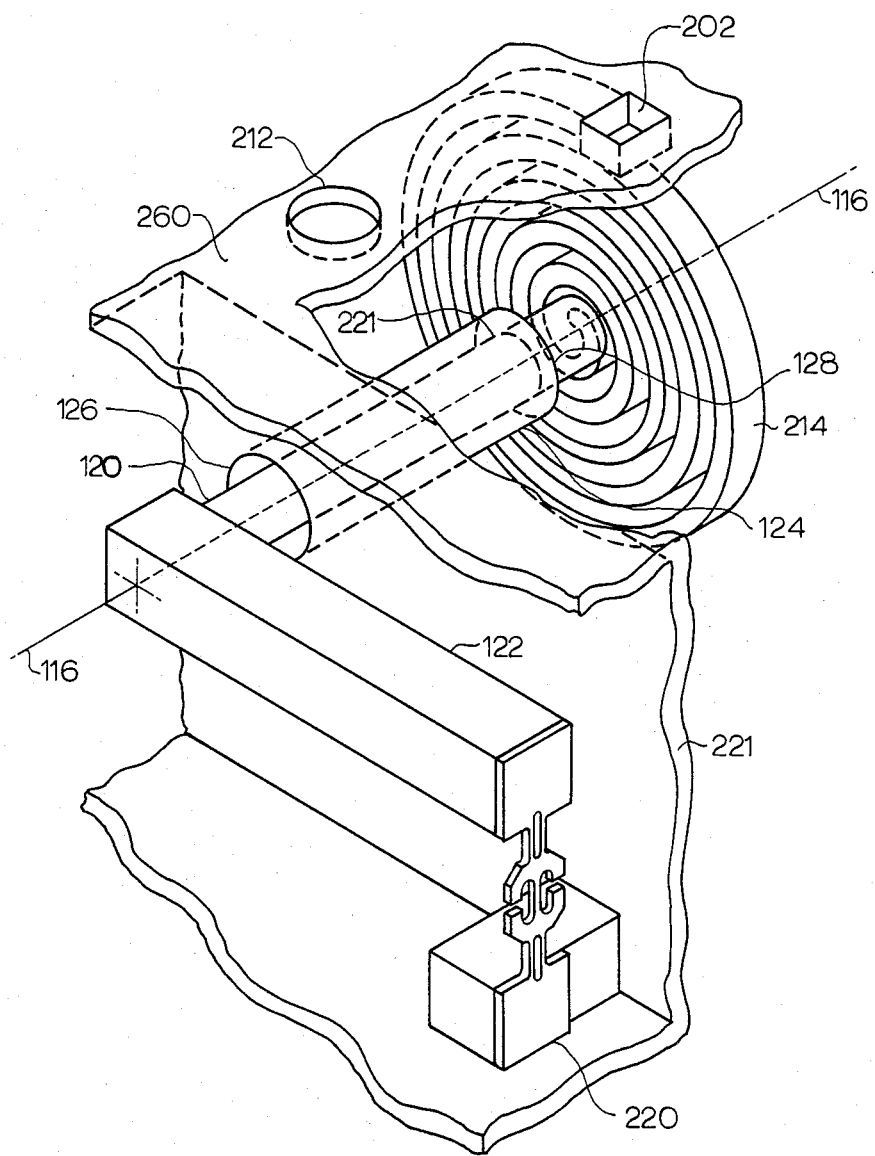
FIG. 5 is an isometric view of a torque tube digital differential pressure transducer employing a Bourdon tube as the pressure-sensitive element.

FIG. 5 illustrates another embodiment of a torque tube digital differential pressure transducer, including an airtight enclosure 260 having pressure inlet ports 202 and 212. Port 202 is sealed to and communicates with the interior of pressure-sensitive Bourdon element 214. Port 212 communicates with the exterior of Bourdon element 214. Differential pressure applied between ports 202 and 212 causes Bourdon element 214 to generate a torque about axis 116. This torque is transmitted through shaft 120 and arm 122 to stress-sensitive resonator 220. Flexible torque tube 124 is sealed at shaft end 128 and at a barrier 221 dividing enclosure 260 into two sections at end 126, thus isolating resonator 220 from fluids entering port 212. Resonator 220 can operate in a vacuum or inert atmosphere and still measure the loads applied by Bourdon element 214 which are induced by pressure differentials in ports 202 and 212.

We claim:

1. A digital differential pressure sensor comprising:
an airtight enclosure having first and second sections isolated from each other by a barrier, and a pair of pressure ports in the first section of said enclosure;
a pressure vessel mounted in the first section of said enclosure and communicating with one of said pressure ports so that said pressure ports are isolated from each other by said pressure vessel, said pressure vessel generating a torque about an axis of rotation responsive to changes in the difference in fluid pressure applied to said pressure ports;
a torque shaft coupled to said pressure vessel and extending along said axis of rotation from the interior of the first section of said enclosure through an aperture in said barrier and into the second section of said enclosure;
a lever arm connected to said torque shaft within the second section of said enclosure;
a stress-sensitive resonator mounted in the second section of said enclosure and coupled to said lever arm so that torque applied to said torque shaft stresses said resonator through said lever arm, thereby varying the resonant frequency of said resonator as a function of the differential fluid pressure applied between said fluid ports; and
a torque tube surrounding said torque shaft as it extends between the first and second sections of said enclosure, said torque tube sealingly engaging the aperture of said barrier at a first area of said tube and sealingly engaging said torque shaft at a second area of said torque tube axially spaced from said first area, said torque tube being relatively compliant to torsional stresses applied to said torque tube by said torque shaft so that torque applied to said torque shaft by said pressure vessel is restrained primarily by said resonator, said torque tubing being relatively rigid to axial stresses so that said torque tube seals the aperture in said barrier to maintain the first and second sections of said enclosure isolated from each other and restricts axial movement of said torque shaft.

2. The pressure transducer of claim 1 wherein said torque tube has a cylindrical configuration and is coaxial with said torque shaft, said torque tube further including a cover plate connecting said torque to said torque shaft and occupying a plane that is perpendicular to the axis of said torque shaft and torque tube, said cover plate being relatively rigid to restrain axial movement of said torque shaft but to allow torque-induced stress of said torque shaft to be transmitted primarily to said stress-sensitive resonator.

3. The pressure transducer of claim 1 wherein said torque shaft is supported by a pair of spaced-apart pivots, each having a pivot axis that is coaxial with the axis of rotation of said torque shaft, thereby restraining said torque shaft from movement perpendicular to the axis of said torque shaft.

4. The pressure transducer of claim 3 wherein each of said pivots is mounted on an elongated member which is, in turn, supported by a second pivot having a pivot axis that is perpendicular to the axis of rotation of said torque shaft to allow axial movement of said torque shaft without stressing the pivot that is coaxial with said torque shaft.

5. The pressure transducer of claim 3 wherein said torque shaft is connected to at least one of said pivots by a coupling member that is relatively compliant along the axis of rotation of said torque shaft and relatively rigid about the axis of rotation of said torque shaft, whereby said coupling member allows axial movement of said torque shaft without stressing said pivot while transmitting torque from said pressure vessel to said torque shaft.

6. The pressure transducer of claim 5 wherein said coupling member includes a pair of spaced-apart, elongated members connected to each other by spaced-apart interconnections, said elongated members being arranged substantially parallel to each other and substantially perpendicular to the axis of said torque shaft, a portion of one elongated member intermediate said interconnections being connected to said torque shaft and a portion of the other elongated member intermediate said interconnections being connected to said pivot, said elongated members being relatively rigid to bending forces applied between said interconnections about the axis of rotation of said torque shaft and at lest one of said elongated members being relatively compliant to bending forces applied between said interconnections along the axis of rotation of said torque shaft, whereby said elongated members allow axial movement of said torque shaft without stressing said pivot and transmit torque from said pressure vessel to said torque shaft.

7. The pressure transducer of claim 1 wherein said pressure vessel is a resilient bellows connected to said torsion shaft by an elongated lever.

8. The pressure transducer of claim 7, further including a pair of stops positioned adjacent opposite surfaces of said elongated lever in the direction of movement of said lever, said stops preventing movement of said lever beyond predetermined points to protect said resonator from excessive pressure-induced forces.

9. The pressure transducer of claim 1 wherein said pressure vessel is a coiled Bourdon tube having an outer portion communicating with one of said pressure ports and the center portion of said tube connected directly to said torsion shaft so that said Bourdon tube tends to coil and uncoil responsive to decreases and increases, respectivley, in the differential pressure applied between said fluid ports.

10. The pressure transducer of claim 1 wherein said resonator is fabricated from quartz crystal.

11. The pressure transducer of claim 1 wherein said resonator is a double-ended tuning fork having one node coupled to said lever arm and its other node fixedly mounted in the second section of said enclosure.

12. The pressure tranducer of claim 1 wherein said resonator is a single resonant beam having one end coupled to said lever arm and its other end fixedly mounted in the second section of said enclosure.

13. A digital differential pressure tranducer, comprising:
an airtight enclosure having a first pressure port communicating with the interior thereof;
differential pressure-sensing means mounted in said enclosure and cmmunicating with a second pressure port so that said pressure ports are isolated from each other by said differential pressure-sensing means, said pressure-sensing means generating a torque about an axis of rotation responsive to changes in the difference in fluid pressure applied to said pressure ports;
a torque shaft coupled to said pressure-sensing means, said torque shaft extending along said rotational axis;
a stress-sensitive resonator in said enclosure;

coupling means coupling said torque shaft to said resonator so that the differential pressure-induced torque applied to said torque shaft streses said resonator, thereby varying the resonant frequency of said resonator as a function of the differential pressure between said fluid ports; and a barrier separating said pressure-sensing means from said resonator, said barrier having formed therein an aperture through which said torque shaft extends; and a torque tube surrounding said torque shaft as it extends through the aperture of said barrier, said torque tube sealingly engaging the aperture of said barrier at a first area of said torque tube and sealingly engaging said torque shaft at a second area of said torque tube axially spaced from said first area, said torque tube being relatively compliant to torsional stresses so that rotation of said torque shaft is restrained primarily by said resonator, said torque shaft being relatively rigid to axial stresses so that said torque tube seals the aperture in said barrier to maintain said resonator in isolation from the external environment applied through said first pressure port and restricts axial movement of said torque shaft.

14. The pressure transducer of claim 13 wherein said torque tube has a cylindrical configuration and is coaxial with said torque shaft, said torque tube further including a cover plate connecting said torque tube to said torque shaft and occupying a plane that is perpendicular to the axis of rotation of said torque shaft and torque tube, said cover plate being relatively rigid to restrain axial movement of said torque shaft but to allow torque-induced stress of said torque shaft to be transmitted primarily to said stress-sensitive resonator.

15. The pressure transducer of claim 13 wherein said torque shaft is supported at spaced-apart locations by pivot means having a pivot axis that is coaxial with the axis of rotation of said torque shaft, therby restraining said torque shaft from movement perpendicular to the axis of rotation of said torque shaft.

16. The pressure transducer of claim 15 wherein said pivot means is mounted on an elongated member, which is, in turn, supported by pivot means having a pivot axis that is perpendicular to the axis of rotation of said torque shaft to allow axial movement of said torque shaft without stressing the pivot means that has a pivot axis which is coaxial with the axis of rotation of said torque shaft.

17. The pressure transducer of claim 15 wherein said torque shaft is connected to at least one of said pivot means by second coupling means that are relatively compliant along the axis of rotation of said torque shaft and relatively rigid about the axis of rotation of said torque shaft, whereby said second coupling means allows axial movement of said torque shaft without stressing said pivot means and transmits torque from said pressure-sensing means to said torque shaft.

18. The pressure transducer of claim 13 wherein said pressure-sensing means is a resilient bellows.

19. The pressure transducer of claim 13 wherein said pressure-sensing means is a coiled Bourdon tube having an outer portion of said tube communicating with said first pressure port and the center portion of said Bourdon tube connected directly to said torsion shaft so that Bourdon tube tends to coil and uncoil responsive to decreases and increases, respectively, in the differential pressure applied between said first and second fluid ports.

20. The pressure transducer of claim 13 wherein said resonator is fabricated from quartz crystal.

21. The pressure transducer of claim 13 wherein said resonator is a double-ended tuning fork having one node coupled to said torque shaft and its other node fixedly mounted in said enclosure.

22. The pressure tranducer of claim 13 wherein said resonator is a single resonant beam having one end coupled to said torque shaft and its other end fixedly mounted in said enclosure.

23. A digital differential pressure transducer, comprising:

an airtight enclosure having a first pressure port communicating with the interior thereof;

differential pressure-sensing means mounted in said enclosure and communicating with a second pressure port so that said pressure ports are isolated from each other by said differential pressure-sensing means, said pressure-sensing means generating a torque about an axis of rotation responsive to changes in the difference in fluid pressure applied to said pressure ports;

a torque shaft coupled to said pressure-sensing means, said torque shaft extending along said rotational axis and being supported at spaced-apart locations by pivot means having a pivot axis that is coaxial with the axis of rotation of said torque shaft thereby restraining said torque shaft from movement perpendicular to the axis of rotation of said torque shaft, said pivot means being mounted on an elongated member, which is, in turn, supported by pivot means having a pivot axis that is perpendicular to the axis of rotation of said torque shaft to allow axial movement of said torque shaft without stressing the pivot means that has a pivot axis which is coaxial with the axis of rotation of said torque shaft.

24. A digital differential pressure transducer, comprising:

an airtight enclosure having a first pressure port communicating with the interior thereof;

differential pressure-sensing means mounted in said enclosure and communicating with a second pressure port so that said pressure ports are isolated from each other by said differential pressure-sensing means, said pressure-sensing means generating a torque about an axis of rotation responsive to changes in the difference in fluid pressure applied to said pressure ports; and a torque shaft coupled to said pressure-sensing means, said torque shaft extending along said rotational axis and being supported at spaced-apart locations by pivot means having a pivot axis that is coaxial with the axis of rotation of said torque shaft thereby restraining said torque shaft from movement perpendicular to the axis of rotation of said torque shaft, said torque shaft being connected to at least one of said pivot means by second coupling means that are relatively compliant along the axis of rotation of said torque shaft and relatively rigid about the axis of rotation of said torque shaft, whereby said second coupling means allows axial movement of said torque shaft without stressing said pivot means and transmits torque from said pressure-sensing means to said torque shaft.

* * * * *

UNITED STATES PATENT AND TRADEMARK OFFICE
CERTIFICATE OF CORRECTION

PATENT NO. : 4,651,569
DATED : March 24, 1987
INVENTOR(S) : Jerome M. Paros, Walter P. Kistler and Donald W. Busse It is certified that error appears in the above—identified patent and that said Letters Patent is hereby corrected as shown below:

In the claims:

Col. 7, line 36 change "tubing" to --tube--

Col. 8, line 18 change "lest" to --least--

Col. 8, line 58 change "cmmunicating" to --communicating--

Col. 9, line 3 change "streses" to -stresses--

Signed and Sealed this

Twenty-fourth Day of November, 1987

Attest:

DONALD J. QUIGG

Attesting Officer

Commissioner of Patents and Trademarks